United States Patent
Lin et al.

(10) Patent No.: US 11,657,282 B2
(45) Date of Patent: May 23, 2023

(54) EFFICIENT INFERENCING WITH FAST POINTWISE CONVOLUTION

(71) Applicant: QUALCOMM Incorporated, San Diego, CA (US)

(72) Inventors: Jamie Menjay Lin, San Diego, CA (US); Yang Yang, San Diego, CA (US); Jilei Hou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 914 days.

(21) Appl. No.: 16/571,760

(22) Filed: Sep. 16, 2019

(65) Prior Publication Data
US 2021/0081765 A1    Mar. 18, 2021

(51) Int. Cl.
*G06N 3/04* (2023.01)
*G06F 17/15* (2006.01)
(Continued)

(52) U.S. Cl.
CPC ........... *G06N 3/0472* (2013.01); *G06F 17/15* (2013.01); *G06F 17/16* (2013.01); *G06K 9/6262* (2013.01);
(Continued)

(58) Field of Classification Search
CPC ....... G06F 17/15; G06F 17/16; G06K 9/6262; G06K 9/6267; G06N 3/04; G06N 3/0454;
(Continued)

(56) References Cited

U.S. PATENT DOCUMENTS

| | | | | |
|---|---|---|---|---|
| 2018/0137406 A1* | 5/2018 | Howard | ............... | G06N 3/0454 |
| 2019/0102675 A1* | 4/2019 | Biswas | ................. | G06N 7/005 |

(Continued)

OTHER PUBLICATIONS

Shaahin Angizi, "CMP-PIM: An Energy-Efficient Comparator-based Processing-In-Memory Neural Network Accelerator,"Jun. 24, 2018,DAC '18: Proceedings of the 55th Annual Design Automation Conference Jun. 2018 Article No. 105,pp. 1-4.*

(Continued)

*Primary Examiner* — Omar S Ismail
(74) *Attorney, Agent, or Firm* — Patterson & Sheridan, L.L.P

(57) ABSTRACT

Embodiments described herein relate to a method, comprising: receiving input data at a convolutional neural network (CNN) model; generating a factorized computation network comprising a plurality of connections between a first layer of the CNN model and a second layer of the CNN model, wherein: the factorized computation network comprises N inputs, the factorized computation network comprises M outputs, and the factorized computation network comprises at least one path from every input of the N inputs to every output of the M outputs; setting a connection weight for a plurality of connections in the factorized computation network to 1 so that a weight density for the factorized computation network is <100%; performing fast pointwise convolution using the factorized computation network to generate fast pointwise convolution output; and providing the fast pointwise convolution output to the second layer of the CNN model.

27 Claims, 11 Drawing Sheets

(51) Int. Cl.
*G06F 17/16* (2006.01)
*G06K 9/62* (2022.01)
*G06N 3/08* (2023.01)
*G06T 7/70* (2017.01)
*G06V 40/10* (2022.01)
*G06N 3/084* (2023.01)

(52) U.S. Cl.
CPC ............... *G06N 3/04* (2013.01); *G06N 3/08* (2013.01); *G06N 3/084* (2013.01); *G06K 9/6267* (2013.01); *G06T 7/70* (2017.01); *G06T 2207/20084* (2013.01); *G06V 40/10* (2022.01)

(58) Field of Classification Search
CPC ........ G06N 3/0472; G06N 3/08; G06N 3/082; G06N 3/084; G06T 2207/20084; G06T 7/70; G06V 40/10
See application file for complete search history.

(56) References Cited

U.S. PATENT DOCUMENTS

| | | | | |
|---|---|---|---|---|
| 2019/0138903 A1* | 5/2019 | Bose | ................. | G06N 3/08 |
| 2019/0147318 A1* | 5/2019 | Howard | ................. | G06N 3/04 |
| | | | | 706/27 |
| 2019/0147335 A1* | 5/2019 | Wang | ................. | G06K 9/00 |
| | | | | 706/20 |
| 2019/0205746 A1* | 7/2019 | Nurvitadhi | ........... | G06N 20/00 |
| 2019/0266478 A1* | 8/2019 | Amir | ................. | G06F 7/544 |
| 2020/0134400 A1* | 4/2020 | Liu | ................. | G06V 10/82 |
| 2020/0202213 A1* | 6/2020 | Darvish Rouhani | ................. | |
| | | | | G06N 3/0454 |
| 2021/0350234 A1* | 11/2021 | Yao | ................. | G06K 9/6232 |

OTHER PUBLICATIONS

Yingjian Ling ,"TaiJiNet : Towards Partial Binarized Convolutional Neural Network for Embedded Systems,"Aug. 9, 2018,2018 IEEE Computer Society Annual Symposium on VLSI,pp. 136-138.*

Yun Liang , "Evaluating Fast Algorithms for Convolutional Neural Networks on FPGA," Feb. 4, 2019, IEEE Transactions On Computer-Aided Design of Integrated Circuits and Systems, vol. 39, No. 4, Apr. 2020,pp. 857-863.*

Keivan Alizadeh vahid , "Butterfly Transform: An Efficient FFT Based Neural Architecture Design,"Jun. 2020, 2020 IEEE/CVF Conference on Computer Vision and Pattern Recognition (CVPR),pp. 12021-12026.*

International Search Report and Written Opinion—PCT/US2020/050896—ISA/EPO—dated Jan. 26, 2021.

Vahid K.A., et al., "Butterfly Transform: An Efficient FFT Based Neural Architecture Design", Arxiv.Org, Cornell University Library, 201 OLIN Library Cornell University Ithaca, NY, 14853, Jun. 5, 2019 (Jun. 5, 2019), XP081646189, 12 Pages, abstract section 1 ,3, 3.1-3.3, 4, 4.1 figure 2.

Yingjian L., et al., "TaiJiNet: Towards Partial Binarized Convolutional Neural Network for Embedded Systems", 2018 IEEE Computer Society Annual Symposium on VLSI (ISVLSI), IEEE, Jul. 8, 2018 (Jul. 8, 2018), XP033382377, pp. 136-141, DOI: 10.1109/ISVLSI.2018.00034 [retrieved on Aug. 7, 2018] abstract section III.B, VI.

* cited by examiner

| Scheme | Complexity or #Paramaters | N=64 | N=1,024 |
|---|---|---|---|
| Legacy | $N^2$ | 4,096 | 1,048,576 |
| BFT | $2N * \log_2 N$ | 768 | 20,480 |
| FPC | $N * \log_2 N + N$ | 448 | 11,264 |

EFFICIENT INFERENCING WITH FAST POINTWISE CONVOLUTION

INTRODUCTION

Aspects of the present disclosure relate to optimizing machine learning model performance, and in particular to improving the efficiency of pointwise convolutions.

Machine learning may produce a trained model, such as an artificial neural network, classification tree, and the like, which represents a generalized fit to a set of training data that is labeled. Applying the trained model to new data produces inferences, which may be used to gain insights regarding the new data. In some cases, applying the trained model to the new data is referred to as "running an inference" on the new data.

Creating inferences is computationally intensive, especially as model complexity increases. Accordingly, methods are needed for improving the performance of machine learning models, such as by making inferencing more efficient with neural network models.

BRIEF SUMMARY

Certain embodiments provide a method, comprising: receiving input data at a convolutional neural network (CNN) model; generating a factorized computation network comprising a plurality of connections between a first layer of the CNN model and a second layer of the CNN model, wherein: the factorized computation network comprises N inputs, the factorized computation network comprises M outputs, and the factorized computation network comprises at least one path from every input of the N inputs to every output of the M outputs; setting a connection weight for a plurality of connections in the factorized computation network to 1 so that a weight density for the factorized computation network is <100%; performing fast pointwise convolution using the factorized computation network to generate fast pointwise convolution output; and providing the fast pointwise convolution output to the second layer of the CNN model.

Certain embodiments further provide a processing system, comprising: a memory comprising computer-executable instructions; and a first processor configured to execute the computer-executable instructions and cause the processing system to: receive input data at a convolutional neural network (CNN) model; generate a factorized computation network comprising a plurality of connections between a first layer of the CNN model and a second layer of the CNN model, wherein: the factorized computation network comprises N inputs, the factorized computation network comprises M outputs, and the factorized computation network comprises at least one path from every input of the N inputs to every output of the M outputs; set a connection weight for a plurality of connections in the factorized computation network to 1 so that a weight density for the factorized computation network is <100%; perform fast pointwise convolution using the factorized computation network to generate fast pointwise convolution output; and provide the fast pointwise convolution output to the second layer of the CNN model.

Certain embodiments further provide a non-transitory computer-readable medium comprising instructions that, when executed by a first processor of a processing system, cause the processing system to perform a method, the method comprising: receiving input data at a convolutional neural network (CNN) model; generating a factorized computation network comprising a plurality of connections between a first layer of the CNN model and a second layer of the CNN model, wherein: the factorized computation network comprises N inputs, the factorized computation network comprises M outputs, and the factorized computation network comprises at least one path from every input of the N inputs to every output of the M outputs; setting a connection weight for a plurality of connections in the factorized computation network to 1 so that a weight density for the factorized computation network is <100%; performing fast pointwise convolution using the factorized computation network to generate fast pointwise convolution output; and providing the fast pointwise convolution output to the second layer of the CNN model.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
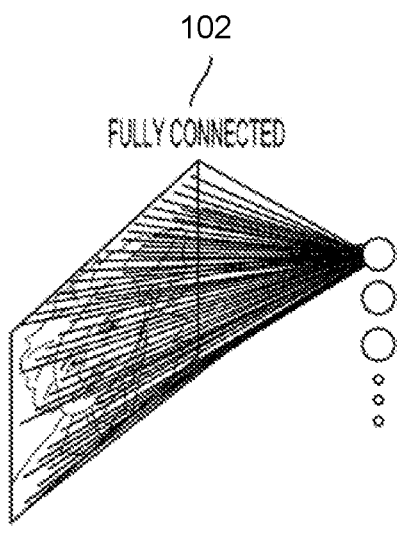
FIGS. 1A-1D depict examples of various types of neural networks.

Aspects of the present disclosure provide apparatuses, methods, processing systems, and computer-readable mediums for optimizing machine learning model performance, and in particular for improving the efficiency of pointwise convolutions.

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning.

Prior to the advent of deep learning, a machine learning approach for a task may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise.

Deep learning architectures, in contrast, may learn to represent features that are similar to what a human engineer might design, but through training. Furthermore, a deep network (e.g., a deep neural network) may learn to represent and recognize new types of features that a human might not have considered.

A deep learning architecture may be configured to learn a hierarchy of features. For example, if presented with visual data, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. For example, in feed-forward networks, information is passed from lower to higher layers, with each neuron in a given layer communicating to neurons in higher layers.

Neural networks may also have recurrent or feedback (also called top-down) connections. A connection form the output from a neuron in a given layer to another neuron in the same layer is called a recurrent connection. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected.

FIG. 1A illustrates an example of a fully connected neural network 102. In a fully connected neural network 102, a neuron in a first layer may communicate its output to every neuron in a second layer, so that each neuron in the second layer will receive input from every neuron in the first layer.

Figure 1B:
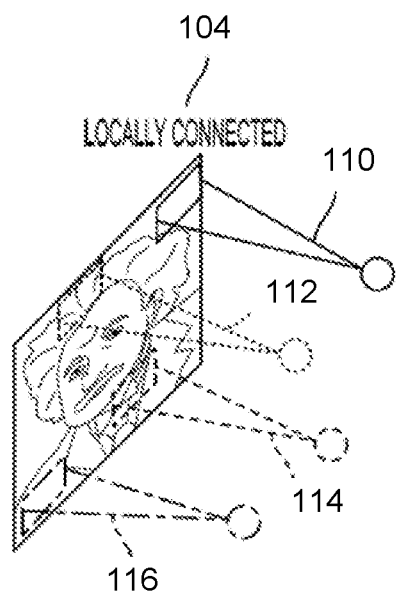

FIG. 1B illustrates an example of a locally connected neural network 104. In a locally connected neural network 104, a neuron in a first layer may be connected to a limited number of neurons in the second layer. More generally, a locally connected layer of the locally connected neural network 104 may be configured so that each neuron in a layer will have the same or a similar connectivity pattern, but with connections strengths that may have different values (e.g., 110, 112, 114, and 116). The locally connected connectivity pattern may give rise to spatially distinct receptive fields in a higher layer, because the higher layer neurons in a given region may receive inputs that are tuned through training to the properties of a restricted portion of the total input to the network.

Figure 1C:
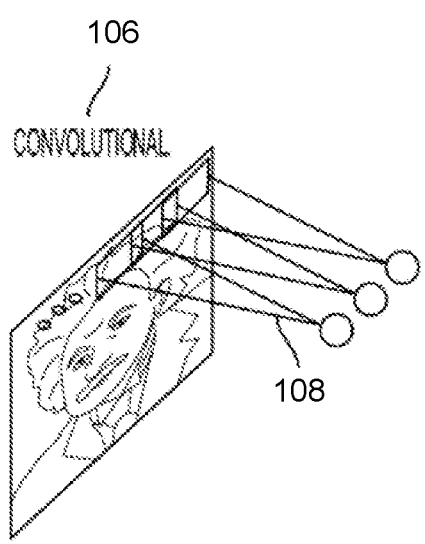

One example of a locally connected neural network is a convolutional neural network. FIG. 1C illustrates an example of a convolutional neural network 106. The convolutional neural network 106 may be configured such that the connection strengths associated with the inputs for each neuron in the second layer are shared (e.g., 108). Convolutional neural networks may be well suited to problems in which the spatial location of inputs is meaningful.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Figure 1D:
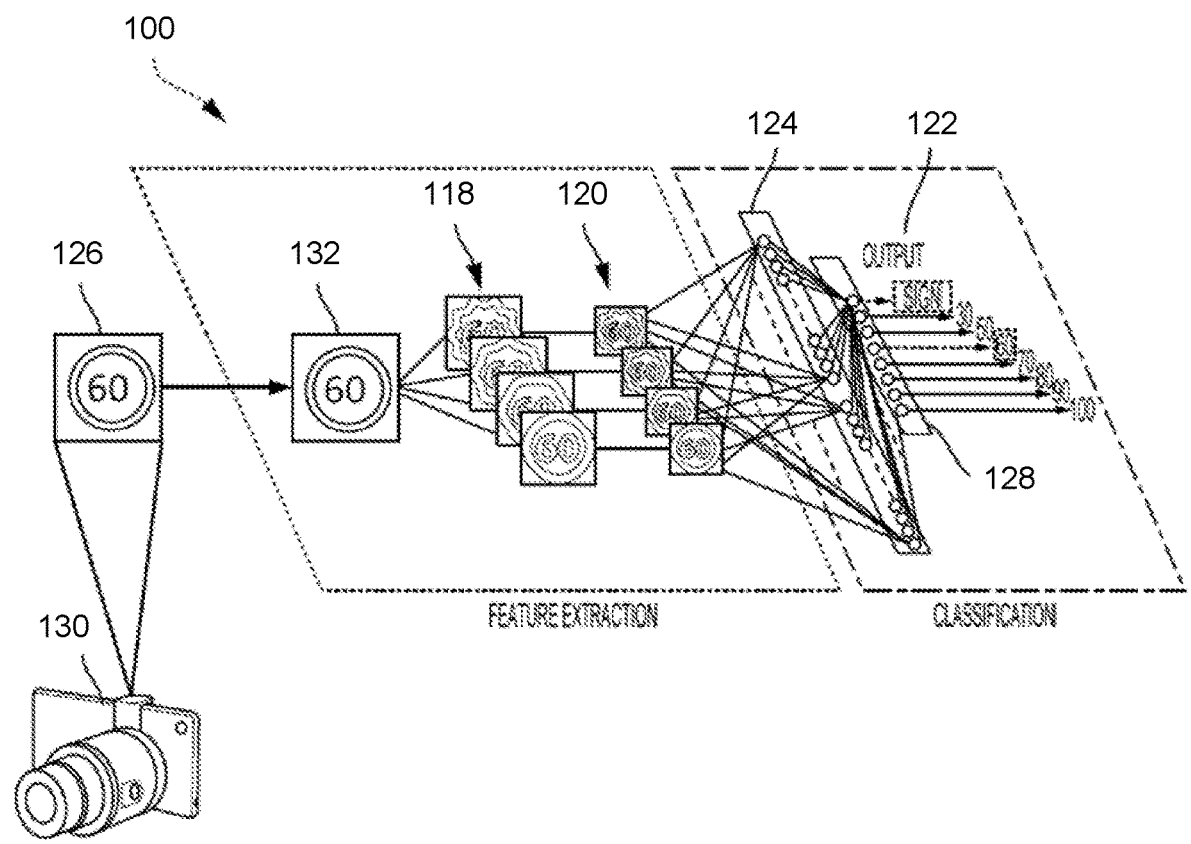

FIG. 1D illustrates a detailed example of a DCN 100 designed to recognize visual features from an image 126 input from an image capturing device 130, such as a car-mounted camera. The DCN 100 of the current example may be trained to identify traffic signs and a number provided on the traffic sign. Of course, the DCN 200 may be trained for other tasks, such as identifying lane markings or identifying traffic lights. These are just some example tasks, and many others are possible.

DCN 100 may be trained with supervised learning. During training, the DCN 100 may be presented with an image, such as the image 126 of a speed limit sign, and a forward pass may then be computed to produce an output 122.

In this example, DCN 100 includes a feature extraction section and a classification section. Upon receiving the image 126, a convolutional layer 132 applies convolutional kernels (not shown) to the image 126 to generate a first set of feature maps 118. Generally, a kernel comprises a two-dimensional array of weights designed to emphasize different aspects of an input data channel, and a filter comprises a three-dimensional structure comprising multiple kernels stacked together. Three-dimensional filters are frequently used in deep learning.

In one example, the convolutional kernel for the convolutional layer 132 may be a 5×5 kernel that generates 28×28 feature maps. Further in the present example, because four different feature maps are generated in the first set of feature maps 118, four different convolutional kernels are applied to the image 126 at the convolutional layer 132. The convolutional kernels may also be referred to as filters or convolutional filters.

The first set of feature maps 118 may be subsampled by a max pooling layer (not shown) to generate a second set of feature maps 120. The max pooling layer reduces the size of the first set of feature maps 118. That is, a size of the second set of feature maps 120, such as 14×14, is less than the size of the first set of feature maps 118, such as 28×28. The reduced size provides similar information to a subsequent layer while reducing memory consumption. The second set of feature maps 120 may be further convolved via one or more subsequent convolutional layers (not shown) to generate one or more subsequent sets of feature maps (not shown).

In the example of FIG. 1D, the second set of feature maps 120 is convolved to generate a first feature vector 124. Furthermore, the first feature vector 124 is further convolved to generate a second feature vector 128. Each feature of the second feature vector 128 may include a number that corresponds to a possible feature of the image 126, such as "sign," "60," and "100." A softmax function (not shown) may convert the numbers in the second feature vector 128 to a probability. As such, an output 122 of the DCN 100 is a probability of the image 126 including one or more features.

In the present example, the probabilities in the output 122 for "sign" and "60" are higher than the probabilities of the others of the output 122, such as "30," "40," "50," "70," "80," "90," and "100".

Before training DCN 100, the output 122 produced by DCN 100 is likely to be incorrect. Thus, an error may be calculated between the output 122 and a target output. The target output is the ground truth of the image 126 (e.g., "sign" and "60"). The weights of DCN 100 may then be adjusted so the output 122 of DCN 100 is more closely aligned with the target output.

To adjust the weights of DCN 100, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, DCN 100 may be presented with new images and a forward pass through the network may yield an output 122 that may be considered an inference or a prediction of the DCN.

Convolution in Convolutional Neural Networks

Convolution is a data analysis technique used in, for example, signal processing, image processing, machine learning, and other technical fields. In deep learning, convolution is used to extract useful features from an input data set. For example, in convolutional neural networks, such as described above, convolution enables the extraction of different features using filters whose weights are automatically learned during training. The extracted features are then combined to make inferences.

One way to reduce the computational burden (e.g., measured in floating point operations per second (FLOPs)) and the number parameters associated with a convolutional neural network is to factorize the convolutional layers, using a separable depthwise convolution, into two components: (1) spatial fusion, where each spatial channel is convolved independently by a depthwise convolution; and (2) channel fusion, where all the spatial channels are linearly combined by 1×1-convolutions, known as pointwise convolutions.

During spatial fusion, the network learns features from the spatial planes and during channel fusion the network learns relations between these features across channels. This is sometimes implemented using 3×3 filters for the spatial fusion, and 1×1 filters for the channel fusion. Generally, channel fusion via pointwise convolution is useful for dimensionality reduction for efficient computations, efficient low dimensional embedding or feature pooling, and for applying nonlinearity again after convolution, to name a few things.

For example, a pointwise convolution may use a 1×1×d kernel that iterates through every single point in an input image of depth d. The depth d of a pointwise convolution kernel generally matches the number of channels of the input data, such as an image with multiple channels for color data.

Generally, an activation layer, such as ReLU, PReLU, Softmax, or others, can be applied after every layer of a neural network. Applying 1×1×d kernels and adding an activation layer after the kernel may give a network added depth, which may increase its performance.

Figure 2:
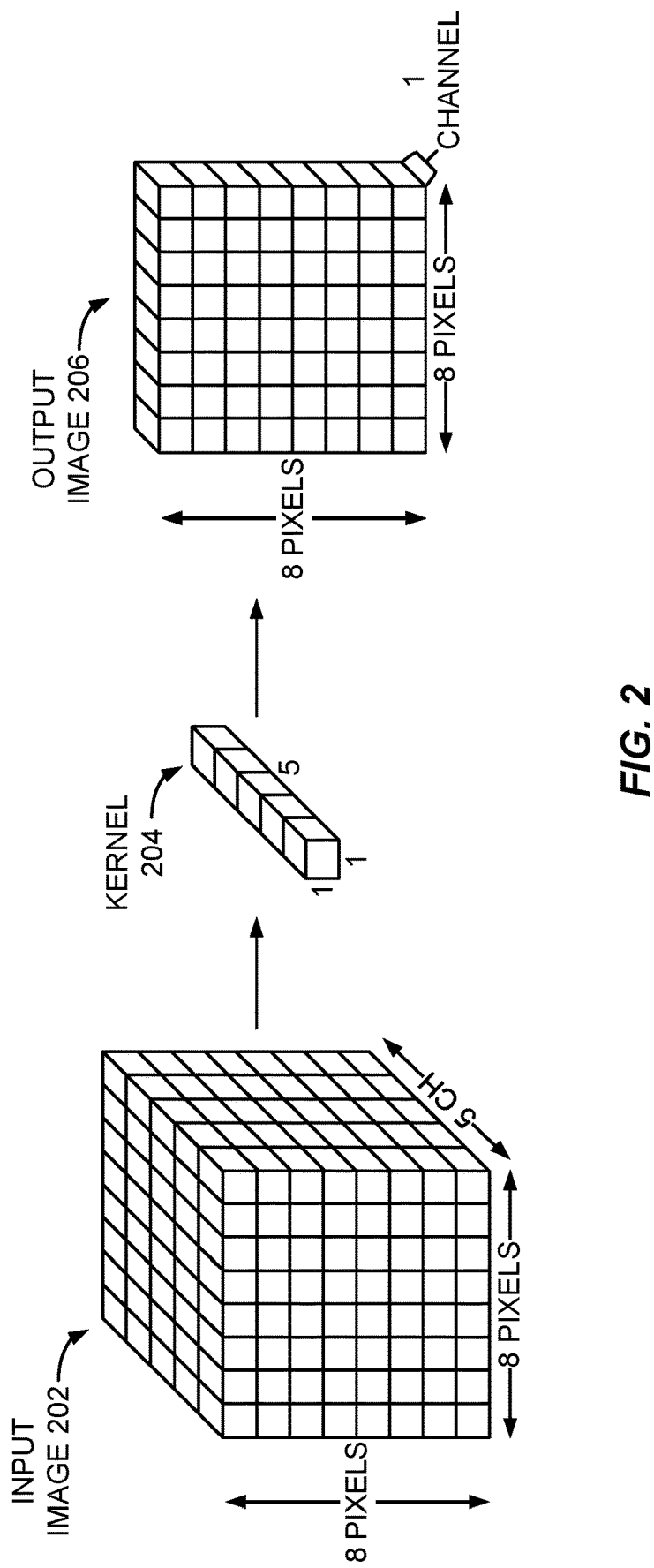
FIG. 2 depicts an example of a pointwise convolution operation.

FIG. 2 depicts an example of a pointwise convolution operation in which a 1×1×5 kernel 204 is iterated through an 8×8×5 input image 202 to generate an 8×8×1 output image 206. As is depicted in this example, output image 206 has reduced dimensionality (1 channel versus 8), which allows for more efficient computations with output image 206.

Though not depicted in FIG. 2, multiple (e.g., m) pointwise convolution kernels (e.g., in a filter) can be used to increase the number of output channels of input data. So, for example, m=256 1×1×5 kernels 204 can be generated, which each output an 8×8×1 output image (e.g., 206), and these output images can be stacked to get a resulting image of 8×8×256, i.e., an image 8 pixels wide by 8 pixels tall with a depth of 256 channels. The resulting increase in output channels provides more parameters for training, which may improve a model's ability to identify features (e.g., in input image 202).

Inspecting the computational profile of factorized convolutional neural networks at inference time reveals that the computational burden of the spatial fusion is relatively small compared to that of the channel fusion. In fact, the computational complexity of the pointwise convolutions in the channel fusion is quadratic in the number of channels ($O(n^2)$) where n is the number of channels.

Figure 3:
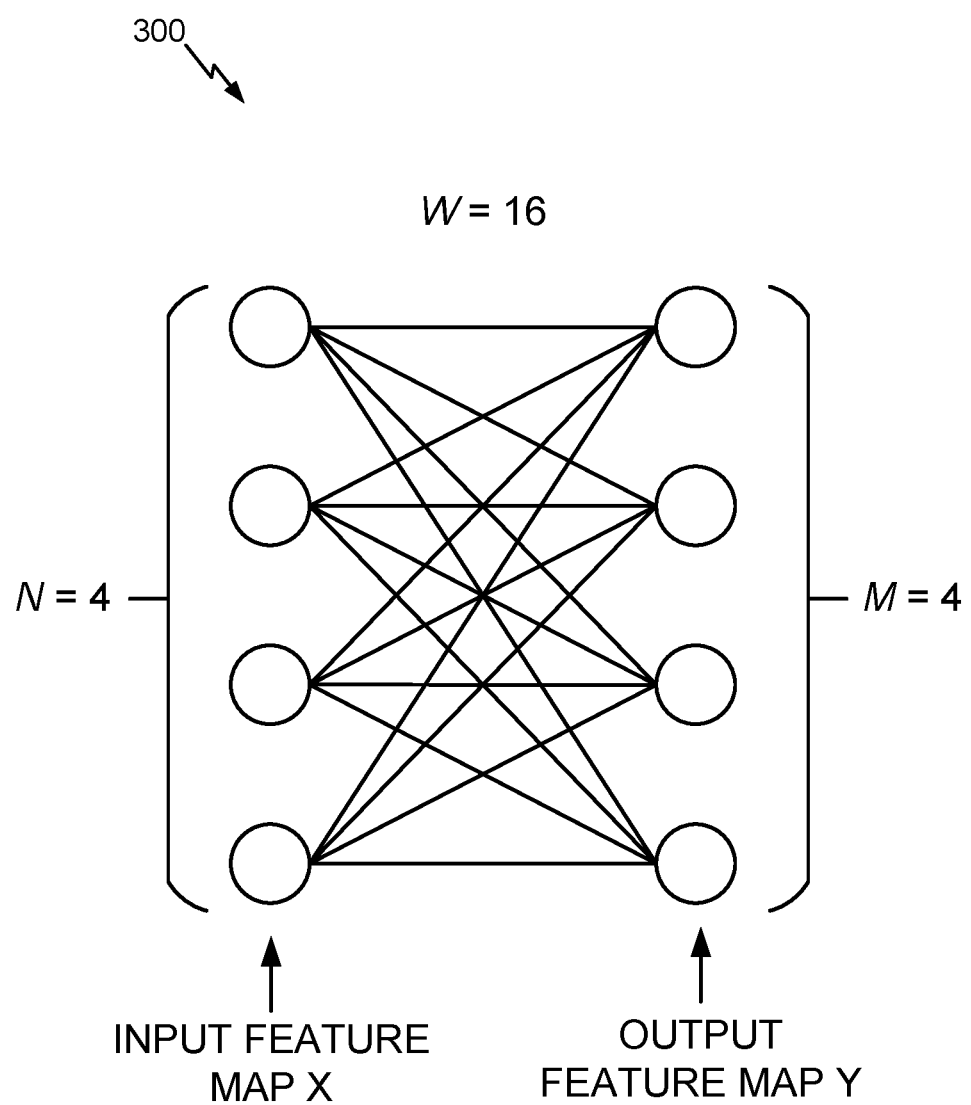
FIG. 3 depicts an example network with input and output activations.

FIG. 3 depicts an example of a fully connected network 300 with N=4 inputs and M=4 outputs. To determine the complexity of performing a conventional pointwise convolution on network 300, consider a pointwise (1×1) convolution that takes the N activations from input feature map X and produces M activations as output feature map Y. Thus:

$$Y=WX, \text{ where } X \in R^N, W \in R^{N*M}, \text{ and } Y \in R^M.$$

In a conventional pointwise convolution operation, there are N*M multiplications between the activations (X) and weights (W); thus, the order of complexity is $O(N^2)$.

Fast Pointwise Convolution Methods

Described herein are fast pointwise convolution methods that use factorization and reduced weight density instead of strictly pointwise multiplication to achieve a similar transformation from feature map X to feature map Y with operation Y=WX at a significantly reduced operational complexity and with reduced number of weights (parameters).

For example, assume X is of shape $[x_0, x_1, x_2, x_3]$ and Y is of shape $[y_0, y_1, y_2, y_3]$, along the $x_1$ and $y_1$ dimensions of X and Y, respectively, and further assume size($x_1$)=N and size($y_1$)=M. Then, a conventional pointwise convolution operates at a complexity of N*M over weights W as defined below:

$$W^{M \times N} = [[w_{01}, w_{02}, \ldots, w_{0(N-1)}], [w_{11}, w_{12}, \ldots, w_{1(N-1)}], \ldots, [w_{(M-1)1}, w_{(M-1)2}, \ldots, w_{(M-1)(N-1)}]]$$

Figures 7A, 7B:
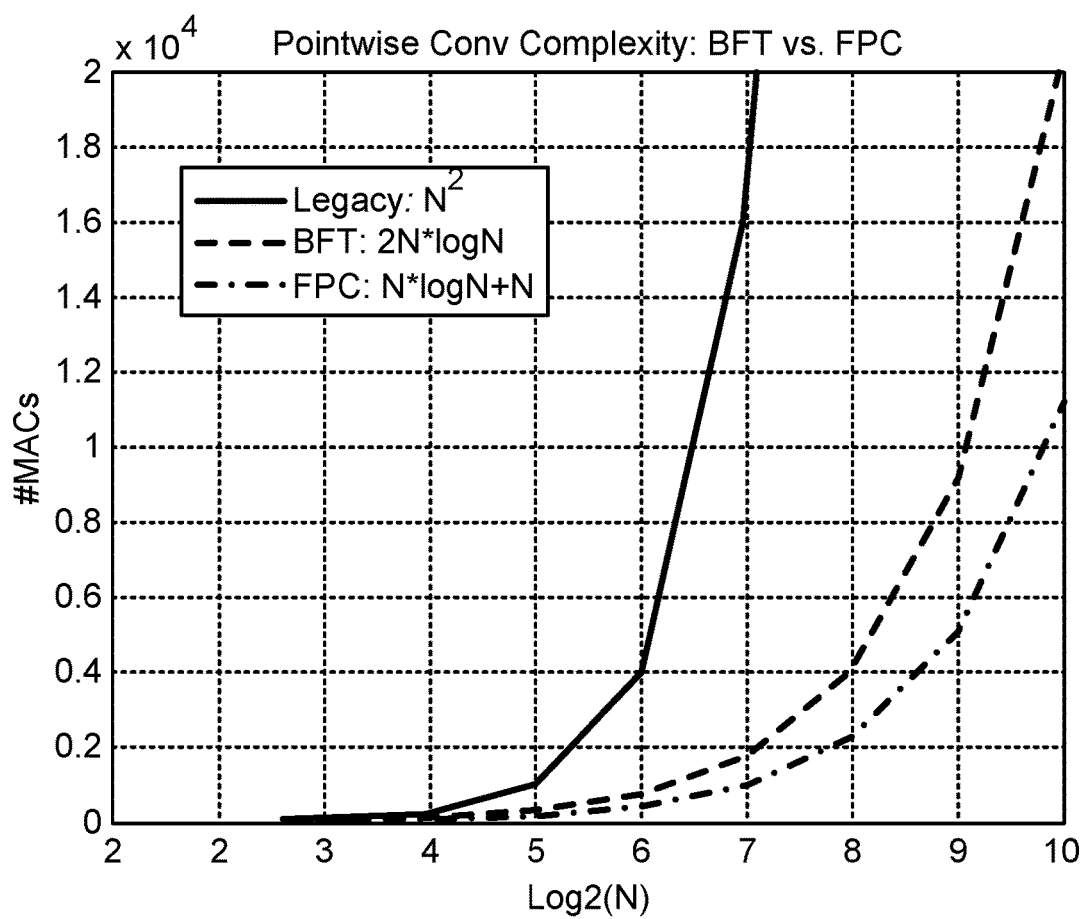
FIGS. 7A and 7B depict example computations showing the performance improvement in terms of both complexity and number of parameters of fast pointwise convolution over conventional pointwise convolution and butterfly transformation pointwise convolution.

By contrast, the methods described herein use factorization and reduced weight density to reduce the number of weights and thus multiplications necessary for pointwise convolution. Weight density may generally refer to the percentage of weighted connections or edges in a network out of all of the connections or edges in the network. In conventional pointwise convolution, the weight density is 100% because all connections in the factorized computation network are weighted. By contrast, the factorization and reduction in weight density described herein results in a required number of parameters and complexity of N*$\log_2$N+ N, which is a significant improvement over N*M for both complexity and the required number of parameters (as depicted in FIGS. 7A and 7B).

Generally, the higher weight density for a given network, the more trainable weights there are for that network, the more expressive the resulting model is based on that network. However, as described further herein, weight density may be varied to strike the right balance between trained model performance and training complexity.

The fast pointwise convolution methods described herein result in a variety of improvements over conventional methods. For example, reducing the number of multiplications needed to perform pointwise convolution reduces power usage and latency in processing systems performing the pointwise convolution. Further, reducing the number of trainable weights reduces model size, which beneficially reduces memory usage (e.g., fewer memory transactions); required memory size (e.g., to hold smaller activations); and latency (because fewer memory transactions). Reducing the size of memories (e.g., on-chip memories) further reduces power usage and cost. Thus, fast pointwise convolution is especially beneficial for mobile devices and resource-constrained edge devices.

Fast pointwise convolution is beneficial in any machine learning context where some accuracy is tradeable for performance. For example, fast pointwise convolution may be used for performing model compression before releasing "run-time" weights in an actual product. The compressed weights may beneficially reduce the memory and processing requirements of the product.

Figure 4:
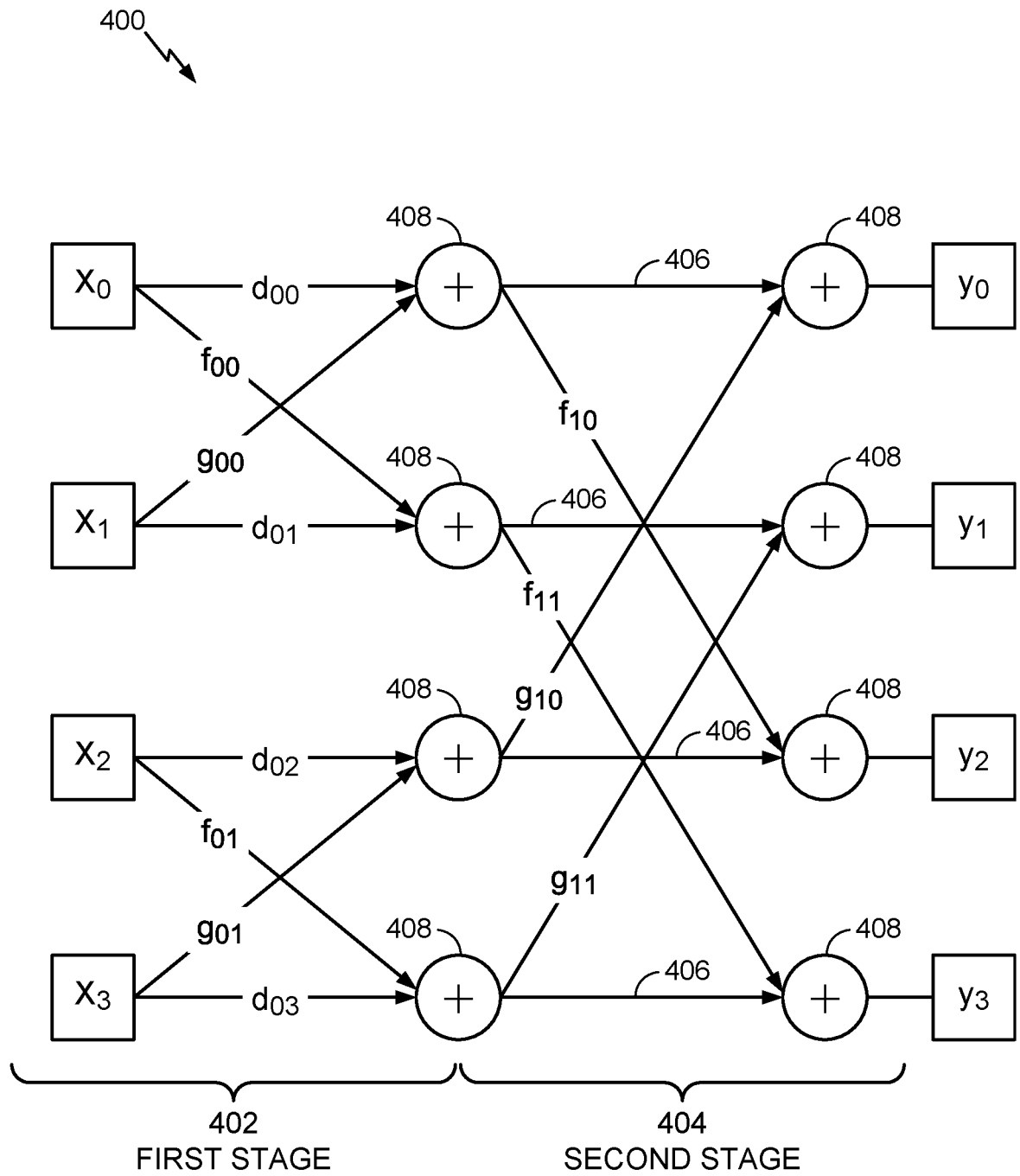
FIG. 4 depicts an example of a fast pointwise convolution method in a bottom-up approach.

FIG. 4 depicts an example of a fast pointwise convolution method in a bottom-up approach on network 400. Network 400 may be referred to as a factorized computation network or graph.

In this example, the following conventions are used: $f_{ij}$ is the jth downward connection weight in the ith stage; $g_{ij}$ is the jth upward connection weight in the ith stage; $d_{ij}$ is the jth direct connection weight in the ith stage; and all other direct connection weights are equal to 1 (alternatively referred to as "identity"). Direct connection weights may alternatively be referred to as horizontal connection weights, and upward and downward connection weights may alternatively be referred to as cross connection weights. Further, connections may alternatively be referred to as edges.

Generally, the computation network 400 comprises a plurality of stages (402 and 404) with inter-stage connections (e.g., $d_{ij}$'s, $f_{ij}$'s and $g_{ij}$'s) that are connected between inputs (e.g., $[x_0, x_1, x_2, x_3]$), addition nodes (e.g., 408), which may also be referred to as accumulator nodes, and outputs (e.g., $[y_0, y_1, y_2, y_3]$). The number of stages n may be determined by $\log_2$ N, where N is the number of inputs (e.g., the number of input channels). Thus, in this example, n=$\log_2$ 4=2.

In this example, in each stage of the factorization, the inputs are organized into distinct pairs, which results in the inputs $[x_0, x_1, x_2, x_3]$ being organized into pairs $[x_0, x_1]$ and $[x_2, x_3]$ in first stage 402 and $[x_0, x_2]$ and $[x_1, x_3]$ in second stage 404.

Then, all first stage 402 direct connection weights ($d_{ij}$) and cross connection weights ($f_{ij}$ and $g_{ij}$) are calculated, which in this example includes $d_{00}$, $f_{00}$, $g_{00}$, $d_{01}$, $d_{02}$, $f_{01}$, $g_{01}$, and $d_{03}$. However, in second stage 404, only the cross connection weights are calculated, which in this example includes $f_{10}$, $g_{10}$, $f_{11}$, and $g_{11}$. The second stage direct connection weights in this example are set equal to 1 (or "identity"), which reduces the weight density of the network 400, and therefore reduces its complexity.

Note that in this example, because of the 0 index origin for the input and output nodes, the stage index number is one less than its ordinal reference. For example, here the "first" stage has a stage index of 0 and the "second stage" has a stage index of 1. These may alternatively be referred to as Stage 0 and Stage 1, consistent with the indexes.

Notably, network 400 is fully connected because every input x is connected to every output y, as with network 300 in FIG. 3, but the reduced number of trainable weights reduces the number of necessary multiplications when calculating the outputs based on the fully-connected inputs. Specifically, in this example, direct connection weights 406 in second stage 404 are all equal to 1 and thus do not need to be trained or multiplied. Rather, the weights from first stage 402 can just be carried along direct connection weights 404. Thus, the factorization of network 400 in this example results in the following equations:

$$y_0 = d_{00}x_0 + g_{00}x_1 + d_{02}g_{10}x_2 + g_{01}g_{10}x_3$$

$$y_1 = f_{00}x_0 + d_{01}x_1 + f_{01}g_{11}x_2 + d_{03}g_{11}x_3$$

$$y_2 = d_{00}f_{10}x_0 + g_{00}f_{10}x_1 + d_{02}x_2 + g_{01}x_3$$

$$y_3 = f_{00}f_{11}x_0 + d_{01}f_{11}x_1 + f_{01}x_2 + d_{03}x_3$$

As depicted in the set of equations above, there are only 12 parameters for this fast pointwise convolution method, as compared to N*M=16 parameters that would be necessary in a conventional pointwise convolution (e.g., as shown in the example of FIG. 3). Thus, in this example, the weight density of network 400 is $^{12}/_{16} = ^{3}/_{4}$ or 75%. Despite the significantly reduced complexity, the performance of the resulting model using this fast pointwise convolution method is very similar to that of conventional pointwise convolution. Thus in contexts where performance is prioritized over absolute performance, fast pointwise convolution is beneficial.

Figure 5:
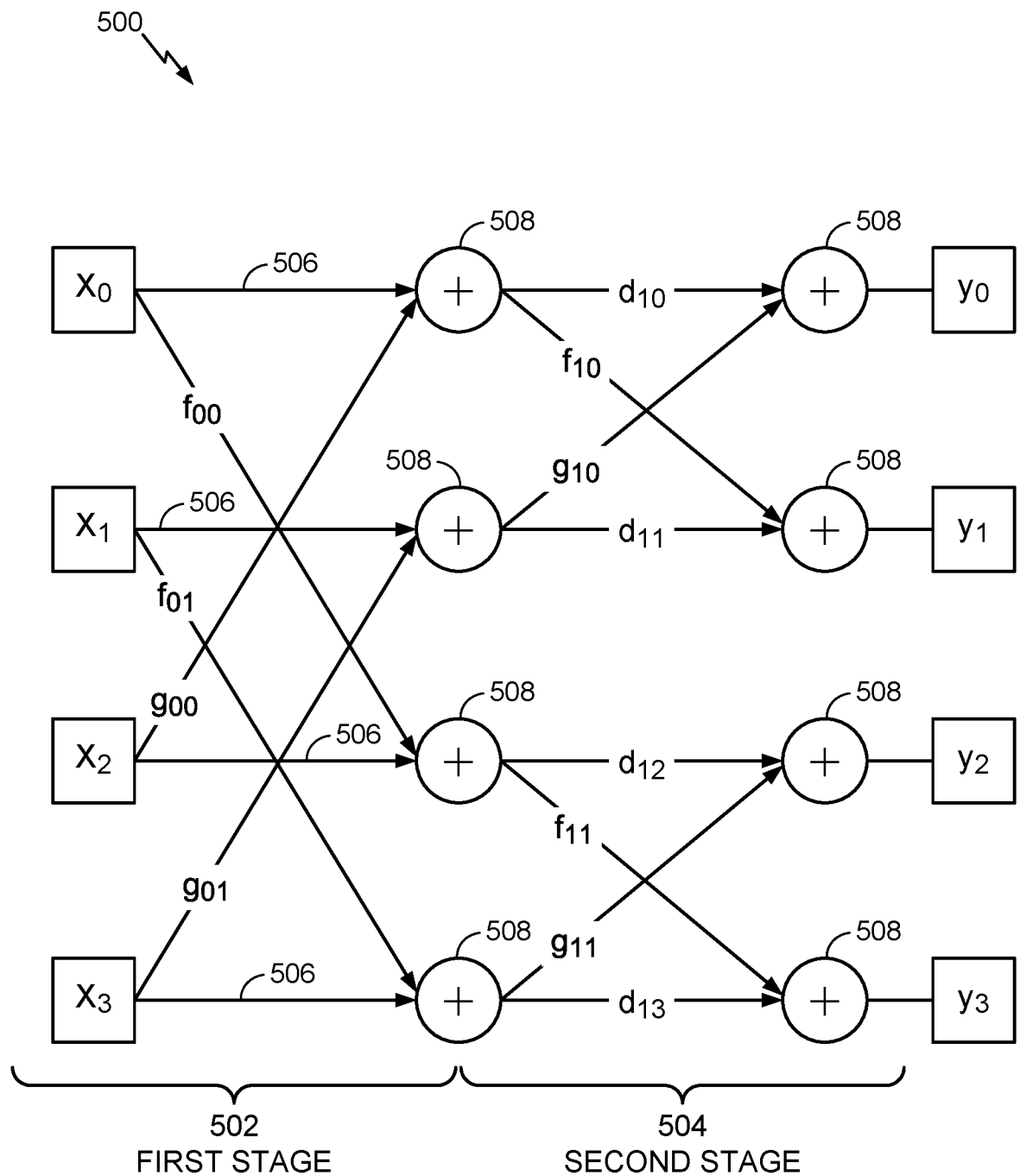
FIG. 5 depicts an example of a fast pointwise convolution method with a top-down approach.

FIG. 5 depicts an example of a fast pointwise convolution method with a top-down approach on network 500. Computationally, this top-down alternative approach is equivalent to the bottom-up approach described and depicted with respect to FIG. 4. However, implementation considerations may lead to a preference for one approach versus the other.

Here again, in each stage of the factorization, the inputs are organized into distinct pairs, and the number of stages n is again determined by n=$\log_2$ N, where N is the number of inputs (e.g., input channels). Thus, in this example, the number of stages for factorization is determined as n=$\log_2$ 4=2. As above, the inputs [$x_0, x_1, x_2, x_3$] may again be organized into pairs [$x_0, x_1$] and [$x_2, x_3$] in first stage 502 and [$x_0, x_2$] and [$x_1, x_3$] in second stage 504.

In this example, only the first stage 502 cross connection weights ($f_{ij}$ and $g_{ij}$) are calculated, which in this example includes $f_{00}, f_{01}, g_{00}$, and $g_{01}$. Then, in second stage 504, the direct connection weights ($d_{ij}$) and cross connection weights ($f_{ij}$ and $g_{ij}$) are calculated, which in this example includes $d_{10}, f_{10}, g_{10}, d_{11}, d_{12}, f_{11}, g_{11}$, and $d_{13}$.

As with network 400 in FIG. 4, here network 500 is fully connected because every input x is connected to every output y. And here again, the use of variable weighting densities across the multiple stages (502 and 504) allows for a reduced number of trainable weights, and thus a reduced number of multiplications. Specifically, in this example, direct connection weights 506 in first stage 504 are all equal to 1 (or identity) and thus do not need to be trained or multiplied. Thus, the factorization of network 400 in this example results in the following equations:

$$y_0 = d_{10}x_0 + g_{10}x_1 + g_{00}d_{10}x_2 + g_{01}g_{10}x_3$$

$$y_1 = f_{10}x_0 + d_{11}x_1 + g_{00}f_{10}x_2 + g_{01}d_{11}x_3$$

$$y_2 = f_{00}d_{12}x_0 + f_{01}g_{11}x_1 + d_{12}x_2 + g_{11}x_3$$

$$y_3 = f_{00}d_{12}x_0 + f_{01}g_{11}x_1 + d_{12}x_2 + g_{11}x_3$$

Here again, there are only 12 parameters in the set of equations above for this fast pointwise convolution method, as compared to N*M=16 parameters that would be necessary in a conventional pointwise convolution (e.g., as shown in the example of FIG. 3). Thus, here again, the weight density of network 500 is $^{3}/_{4}$ or 75%.

Generalized Mathematical Model for Fast Pointwise Convolution

From the examples described with respect to FIGS. 3 and 4, a generalized mathematical model for fast pointwise convolution can be described as follows.

Starting with a simple case, the direct connection weights for N=2 inputs ($D_N$) may be represented as follows:

$$D \triangleq \begin{bmatrix} d & 1 \\ 1 & d \end{bmatrix}$$

Similarly, the downward cross connection weights for N=2 inputs ($F_N$) may be represented as follows:

$$F_2 \triangleq \begin{bmatrix} 1 & 1 \\ f & 1 \end{bmatrix}$$

And finally, the upward cross connection weights for N=2 inputs ($G_N$) may be represented as follows:

$$G_2 \triangleq \begin{bmatrix} 1 & g \\ 1 & 1 \end{bmatrix}$$

Thus, for M=2 outputs, the following expression can be used:

$$Y_2(D_2 \odot F_2 \odot G_2)X_2$$

In the above equation, $\odot$ represents an elementwise multiplication operation.

The above equations for a simple case of N=2 can be generalized for any N inputs, where N=$2^n$ (or equivalently, n=$\log_2$ N) and n is a positive integer, as follows.

First, let $\otimes$ represent a Kronecker multiplication operation. Then, going from N=$2^n \rightarrow 2^{n+1}$, the weight matrices can be represented by the following equations:

$$D_{2^{n+1}} \triangleq D_2 \otimes D_{2^n} = \begin{bmatrix} dD_{2^n} & D_{2^n} \\ D_{2^n} & dD_{2^n} \end{bmatrix}$$

Similarly, the downward cross connection weights may be represented as follows:

$$F_{2^{n+1}} \triangleq F_2 \otimes F_{2^n} = \begin{bmatrix} F_{2^n} & F_{2^n} \\ fF_{2^n} & F_{2^n} \end{bmatrix}$$

And finally, the upward cross connection weights may be represented as follows:

$$G_{2^{n+1}} \triangleq G_2 \otimes G_{2^n} = \begin{bmatrix} G_{2^n} & gG_{2^n} \\ G_{2^n} & G_{2^n} \end{bmatrix}$$

Thus, the following generalized expression:

$$Y_N = (D_N F_N G_N) X_N$$

So, for example, in another example where N=4 inputs and M=4 outputs, the following expression can be used:

$$Y_4 = (D_4 \lfloor F_4 \lfloor G_4 \rfloor) X_4$$

And, the following equations may be derived where N=4 inputs and M=4 outputs:

$$D_4 = \begin{bmatrix} d\begin{bmatrix} d & 1 \\ 1 & d \end{bmatrix} & \begin{bmatrix} d & 1 \\ 1 & d \end{bmatrix} \\ \begin{bmatrix} d & 1 \\ 1 & d \end{bmatrix} & d\begin{bmatrix} d & 1 \\ 1 & d \end{bmatrix} \end{bmatrix} = \begin{bmatrix} dd & d & d & 1 \\ d & dd & 1 & d \\ d & 1 & dd & d \\ 1 & d & d & dd \end{bmatrix}$$

$$F_4 = \begin{bmatrix} 1 & 1 & 1 & 1 \\ f & 1 & f & 1 \\ f & f & 1 & 1 \\ ff & f & f & 1 \end{bmatrix}$$

$$G_4 = \begin{bmatrix} 1 & g & g & gg \\ 1 & 1 & g & g \\ 1 & g & 1 & g \\ 1 & 1 & 1 & 1 \end{bmatrix}$$

Notably, the above equations for N=4 are just one example, and the same derivation can be made incrementally over stages for networks with various numbers of input nodes N.

In one example, the weight density of a computation graph may be reduced by setting certain direct connection weights to 1, such as described above with respect to FIGS. 4 and 5. So, for example, a modified version of the direct connection weight matrix for the example of N=4, $D_4^*$, may be configured where one or more of the indicated d''s are set to 1:

$$D_4^* = \begin{bmatrix} d'd & d' & d & 1 \\ d' & d'd & 1 & d \\ d & 1 & d'd & d' \\ 1 & d & d' & d'd \end{bmatrix}$$

Notably, this is just one example, and many others are possible.

Fast Pointwise Convolution Linear Scaling Method

Because, as above, inputs are organized into pairs when a factorized computation network is created, the number of inputs N is preferably a number of $2^n$, where n is a positive integer. When N is not a number of $2^n$, n may be derived as n=Ceil[$\log_2(N)$], where Ceil[ ] is a ceiling function that rounds a real number towards positive infinity. Having such definition for n guarantees that a computation graph is always equal to or larger than the size needed for any arbitrary N as a positive integer.

Further, if the number of inputs N does not match the number of outputs M, then the factorization scheme described above is not directly applicable. In either case, linear scaling with null-activation skipping may be applied to the fast pointwise convolution computation network so that fast pointwise convolution will work as described above.

The following is an example algorithm for applying linear scaling with null activation skilling. Initially, assume N and M as the number of channels for input and output features, respectively. Then, the following algorithm may be applied to fast pointwise convolution (FPC):

1: Set numStages=int(ceil($\log_2$(max(N, M)))) (sets numStages to the smallest integer value that is bigger than or equal to the $\log_2$ of the larger of N and M);
2: Set $N_{new}=M_{new}=2^{numStages}$; (Note that $N_{new} \geq N$ and $M_{new} \geq M$)
3: Append $N_{new}$–N zeros to the input tensor along the dimension of channel;
4: Perform FPC($N_{new}$, $M_{new}$) instead of FPC(N, M), but skip all multiplication operations that have a "0" value as the input activation; and
5: At the output, return the first M channels of output in tensor along the dimension of channel.

Assume the computation complexity (or number of parameters) for FPC($N_{new}$, $M_{new}$) is C. Then the resultant new complexity (or number of parameters) using this proposed linear scaling method becomes CNM/$N_{new}M_{new}$).

This linear scaling method with null-activation skipping may be implemented, for example, on an ASIC neural network accelerator or other programmable core with specialized instruction/accelerator extensions.

Fast Pointwise Convolution with Skip Connections

Conventional pointwise convolution does not utilize "skip connections", which are connections that skip a layer and may thus also be referred to as "short cut" connections. A motivation for skipping over layers is to simplify the network, using fewer layers in the initial training stages. This speeds learning by reducing the impact of vanishing gradients, as there are fewer layers to propagate through. The network then gradually restores the skipped layers as it learns the feature space.

In the examples discussed with respect to FIGS. 4 and 5 there are no "skip connections". However, these examples may be adapted to use skip connections (i.e., in conjunction with fast pointwise convolution). Generic forms of the fast pointwise convolution skip connections can be expressed in the Y=WX form defined as follows.

With respect to the bottom-up fast pointwise convolution example in FIG. 4:

$$y_0 = (d_{00}+I_0)x_0 + g_{00}x_1 + d_{02}g_{10}x_2 + g_{01}g_{10}x_3$$

$$y_1 = f_{00}x_0 + (d_{01}+I_1)x_1 + f_{01}g_{11}x_2 + d_{03}g_{11}x_3$$

$$y_2 = d_{00}f_{10}x_0 + g_{00}f_{10}x_1 + (d_{02}+I_2)x_2 + g_{01}x_3$$

$$y_3 = f_{00}f_{11}x_0 + d_{01}f_{11}x_1 + f_{01}x_2 + (d_{03}+I_3)x_3$$

And with respect to the top-down fast pointwise convolution example in FIG. 5:

$$y_0 = (d_{10}+I_0)x_0 + g_{10}x_1 + g_{00}d_{10}x_2 + g_{01}g_{10}x_3$$

$$y_1 = f_{10}x_0 + (d_{11}+I_1)x_1 + g_{00}f_{10}x_2 + g_{01}d_{11}x_3$$

$$y_2 = f_{00}d_{12}x_0 + f_{01}g_{11}x_1 + (d_{12}+I_2)x_2 + g_{11}x_3$$

$$y_3 = f_{00}f_{11}x_0 + f_{01}d_{13}x_1 + f_{11}x_2 + (d_{13}+I_3)x_3$$

While $I_0=I_1=I_2=I_3$ are individually configurable, simulation has shown $I_0=I_1=I_2=I_3=1$ to be effective. For example, applying skip connections equal to 1 in conjunction with fast pointwise convolution to achieve equal or better accuracy performance at the reduced computation complexity and using the reduced number of weights. Other choices of these values are possible.

Fast Pointwise Convolution with Variable Stage Weighting

Figure 6:
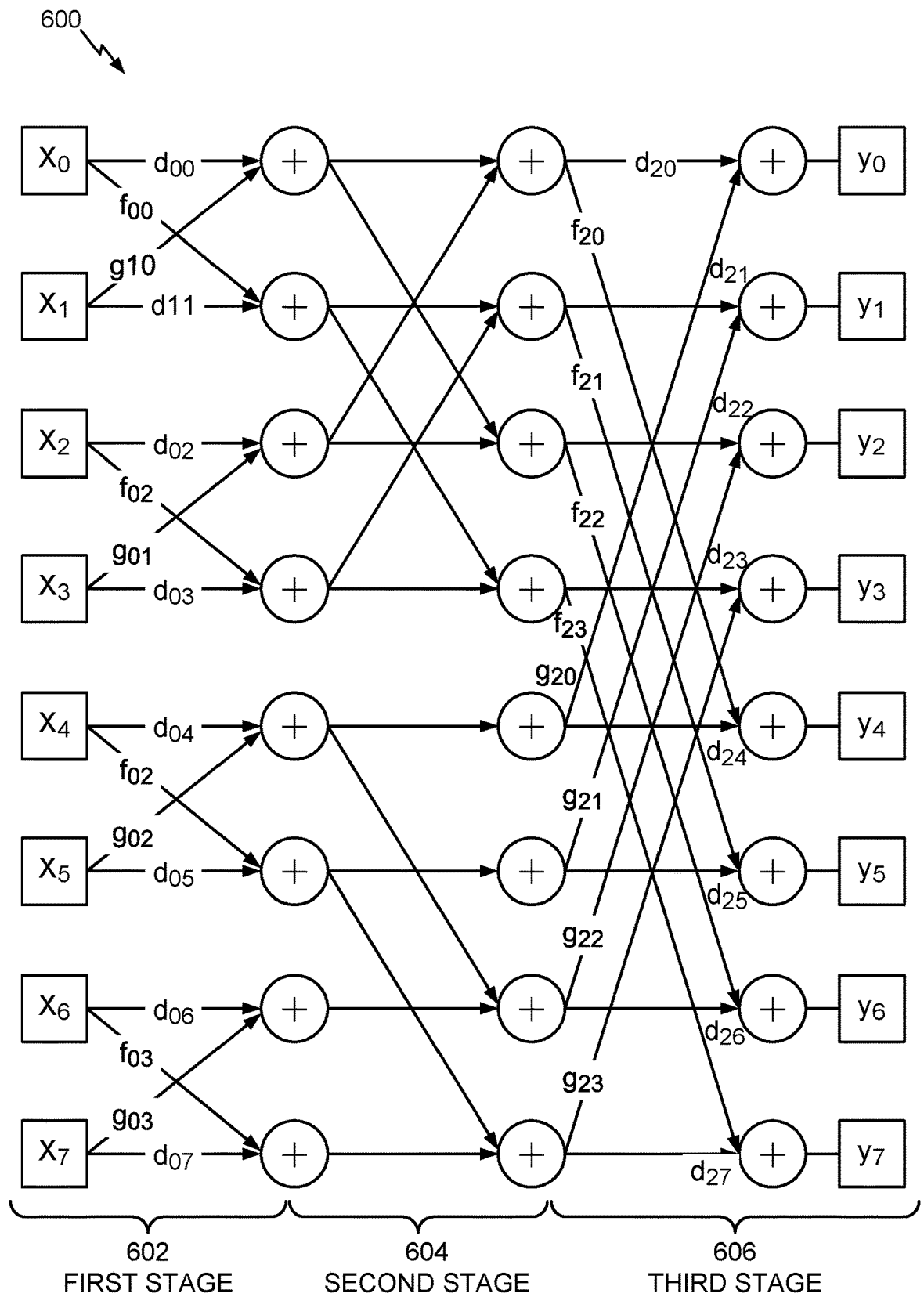
FIG. 6 depicts an example of fast pointwise convolution utilizing a form of variable weight density reduction in which stages are entirely weighted or are entirely not weighted.

FIG. 6 depicts an example of fast pointwise convolution utilizing a form of variable weight density reduction in which stages are entirely weighted or are entirely not weighted. This stage-based weighting reduction may be referred to as structured variable weight density reduction. With structured variable weight density reduction, the weight density may be calculated more simply as the percentage of stages that are weighted out of all of the stages in the factorized computation network.

In the example depicted in FIG. 6, N=8, which results in n=$\log_2$ N=3 stages. Further, in this example, the weight density is ⅔ because the first stage 602 and the third stage 606 are weighted out of the total of three stages (602, 604, and 606), which means that ⅔ of the possible connection weights include a weight other than 1 (i.e., identity). By comparison, in FIGS. 4 and 5, the weight density was ¹²⁄₁₆=¾=75%.

Further, in this example: Stage 0 is a "weighting stage" where weights are calculated; Stage 1 is a "non-weighting stage" where no weights are not calculated (i.e., no direct or cross connection weights); and Stage 2 is another weighting stage. Notably, this is another example of a bottom-up approach where the first stage (Stage 0) includes trainable direct connection weights ($d_{ij}$'s) and cross connection weights ($f_{ij}$'s and $g_{ij}$'s) and the final stage (Stage 2) includes only trainable cross connection weights.

The factorization of network 600 in this example results in the following equations:

$$y_0 = d_{00}d_{20}x_0 + g_{00}d_{20}x_1 + d_{02}d_{20}x_2 + g_{01}d_{20}x_3 + d_{04}g_{20}x_4 + g_{02}g_{20}x_5 + d_{06}g_{20}x_6 + g_{03}g_{20}x_7$$

$$y_1 = f_{00}d_{21}x_0 + d_{01}d_{21}x_1 + f_{01}d_{21}x_2 + d_{03}d_{21}x_3 + f_{02}g_{21}x_4 + d_{05}g_{21}x_5 + f_{03}g_{21}x_6 + d_{07}g_{21}x_7$$

$$y_2 = d_{00}d_{22}x_0 + g_{00}d_{22}x_1 + d_{02}d_{22}x_2 + g_{01}d_{22}x_3 + d_{04}g_{22}x_4 + g_{02}g_{22}x_5 + d_{06}g_{22}x_6 + g_{03}g_{22}x_7$$

$$y_3 = f_{00}x_0 + g_{00}d_{20}x_1 + d_{02}f_{01}d_{23}x_2 + d_{03}d_{23}x_3 + f_{02}g_{23}x_4 + d_{05}g_{23}x_5 + f_{03}g_{23}x_6 + d_{07}g_{23}x_7$$

$$y_4 = d_{00}f_{20}x_0 + g_{00}f_{20}x_1 + d_{02}f_{20}x_2 + g_{01}f_{20}x_3 + d_{04}d_{24}x_4 + g_{02}d_{24}x_5 + d_{06}d_{24}x_6 + g_{03}d_{24}x_7$$

$$y_5 = f_{00}f_{01}x_0 + d_{01}f_{21}x_1 + f_{01}f_{21}x_2 + d_{03}f_{21}x_3 + f_{02}d_{25}x_4 + d_{05}d_{25}x_5 + f_{03}d_{25}x_6 + d_{07}d_{25}x_7$$

$$y_6 = d_{00}f_{22}x_0 + g_{00}f_{22}x_1 + d_{02}f_{22}x_2 + g_{01}f_{22}x_3 + d_{04}d_{26}x_4 + g_{02}d_{26}x_5 + d_{06}d_{26}x_6 + g_{03}d_{26}x_7$$

$$y_7 = f_{00}f_{23}x_0 + d_{01}f_{23}x_1 + f_{01}f_{23}x_2 + d_{03}f_{23}x_3 + f_{02}d_{27}x_4 + d_{05}d_{27}x_5 + f_{03}d_{27}x_6 + d_{07}d_{27}x_7$$

In some cases, a sensitivity analysis may be performed in order to determine the impact (e.g., in terms of trained model performance) of making a particular stage a non-weighting stages or a weighting stage.

Example Performance Improvements Using Fast Pointwise Convolution

FIGS. 7A and 7B depict example computations showing the performance improvement in terms of both complexity and number of parameters of fast pointwise convolution over conventional pointwise convolution and butterfly transformation pointwise convolution.

It is clear from the table in FIG. 7A that there is a dramatic reduction in the number of parameters (e.g., weights) for an N→N pointwise convolution when comparing fast pointwise convolution to conventional pointwise convolution and even to improved performance pointwise convolution, such as by butterfly transformation pointwise convolution. As discussed above, this reduction in parameters directly translates to performance improvements of the processing system performing the pointwise convolution. Further as described above, the reduction in parameter count means that the hardware requirements for supporting models relying on pointwise convolution may be beneficially reduced, which further saves chip area, power usage, and cost, to name just a few benefits.

Similarly, the graph depicted in FIG. 7B depicts the complexity reduction of fast pointwise convolution, as described herein, versus conventional pointwise convolution and butterfly transformation pointwise convolution, in terms of the number of multiply-accumulate operations. The reduction in multiply-accumulate operations beneficially reduces latency and power consumption in a processing system performing the pointwise convolution.

Example Method for Performing Fast Pointwise Convolution

Figure 8:
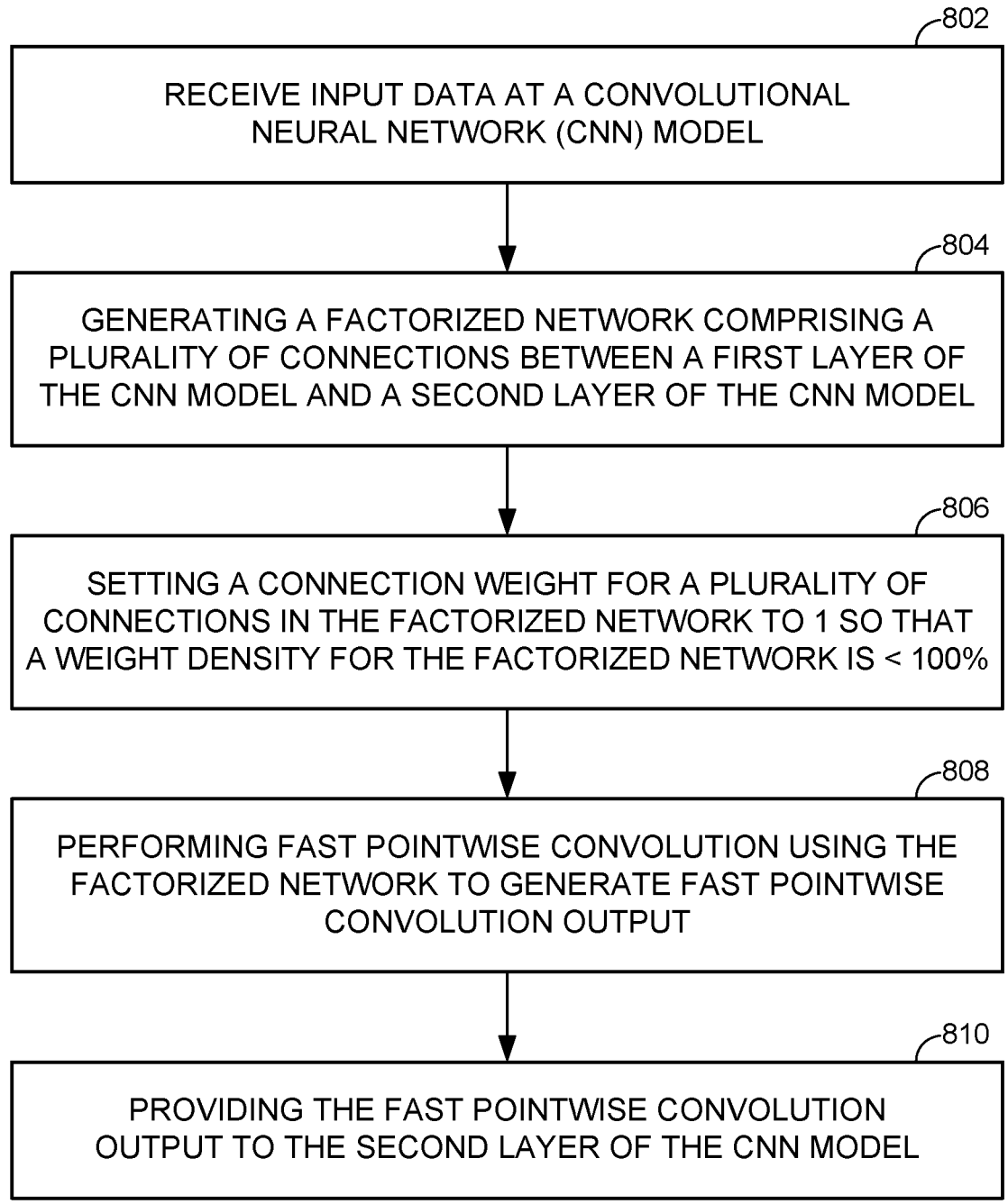
FIG. 8 depicts an example method 800 for performing fast pointwise convolution.

FIG. 8 depicts an example method 800 for performing fast pointwise convolution.

Method 800 begins at step 802 with receiving input data at a convolutional neural network (CNN) model.

Method 800 then proceeds to step 804 with generating a factorized computation network comprising a plurality of connections between a first layer of the CNN model and a second layer of the CNN model. In some embodiments, the factorized computation network comprises N inputs. In some embodiments, the factorized computation network comprises M outputs. In some embodiments, the factorized computation network comprises at least one path from every input of the N inputs to every output of the M outputs.

Method 800 then proceeds to step 806 with setting a connection weight for a plurality of connections in the factorized computation network to 1 so that a weight density for the factorized computation network is <100%.

Method 800 then proceeds to step 808 with performing fast pointwise convolution using the factorized computation network to generate fast pointwise convolution output.

Method 800 then proceeds to step 810 with providing the fast pointwise convolution output to the second layer of the CNN model.

In some embodiments of method 800, the factorized computation network comprises a number of stages n=$\log_2$N.

In some embodiments of method 800, the plurality of connections comprise a plurality of weighting connections connected to addition nodes between the first layer of the CNN model and the second layer of the CNN model, such as described above with respect to FIGS. 4-6 in one embodiment.

In some embodiments, setting the connection weight for the plurality of connections in the factorized computation network to 1 comprises setting all connection weights for at least one stage of the number of stages to 1, such as described above with respect to FIG. 6. In some embodiments, setting the connection weight for the plurality of connections in the factorized computation network to 1 comprises setting a subset of connection weights for at least one stage of the number of stages to 1, such as described above with respect to FIGS. 4 and 5.

In some embodiments, method 800 further comprises: performing linear scaling with null activation skipping to the factorized computation network, such as when $N \neq 2^n$ and n is a positive integer, or when or $N \neq M$.

In some embodiments, such as those performing linear scaling with null activation, providing the fast pointwise convolution output to the second layer of the CNN model comprises providing only a first M channels of the fast pointwise convolution output to the second layer of the CNN model.

In some embodiments, method 800 further comprises: adding a plurality of skip connection to the factorized computation network.

In some embodiments, method 800 further comprises: generating a model output from the CNN model; and providing the generated model output to a low-power application running on a mobile electronic device.

In some embodiments, method 800 further comprises performing, by a first processor, a first inference based on the fast pointwise convolution output; performing, by a second processor, a second fast pointwise convolution using the factorized computation network to generate second fast pointwise convolution output; and providing the second fast pointwise convolution output to the second layer of the CNN model. In other words, fast pointwise convolution maybe be parallelized across hardware resources in multi-processor processing systems. For example, the first processor and second processor may be one of the processors described below with respect to FIGS. 9 and/or 10.

Figure 9:
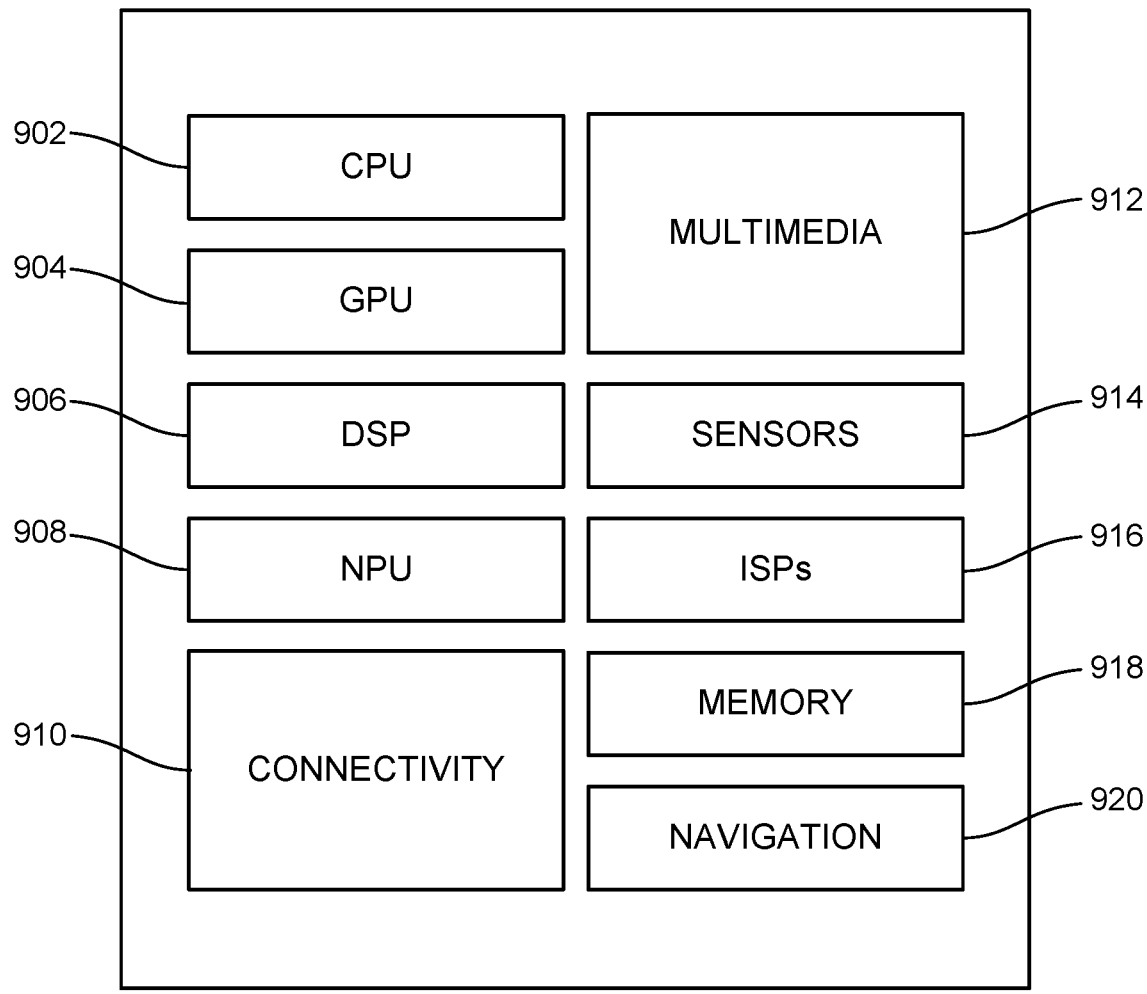
FIG. 9 depicts an example implementation of a system-on-a-chip (SOC) that may be implemented with embodiments described herein.

In some embodiments of method 800, the input data is received from a sensor in a mobile electronic device (e.g., one of sensors 914 in FIG. 9). In some embodiments, the input data is associated with an application running on the mobile electronic device and configured for at least one of: biometric feature detection, human presence detection, environmental condition detection, object detection, or object classification.

In some embodiments of method 800, the input data is one of image data, video data, audio data, or signal data. In other embodiments, the input data may represent other "features" that have been quantified.

Example Processing Systems for Optimizing Machine Learning Model Performance

FIG. 9 illustrates an example implementation of a system-on-a-chip (SOC) 900, which may include a central processing unit (CPU) 902 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 908, in a memory block associated with a CPU 902, in a memory block associated with a graphics processing unit (GPU) 904, in a memory block associated with a digital signal processor (DSP) 906, in a memory block 918, or may be distributed across multiple blocks. Instructions executed at the CPU 902 may be loaded from a program memory associated with the CPU 902 or may be loaded from a memory block 918.

The SOC 900 may also include additional processing blocks tailored to specific functions, such as a GPU 904, a DSP 906, a connectivity block 910, which may include fifth generation (5G) connectivity, fourth generation long term evolution (4G LTE) connectivity, Wi-Fi connectivity, USB connectivity, Bluetooth connectivity, and the like, and a multimedia processor 912 that may, for example, detect and recognize gestures. In one implementation, the NPU is implemented in the CPU 902, DSP 906, and/or GPU 904. The SOC 900 may also include one or more sensor processors 914 associated with any manner of sensor, one or more image signal processors (ISPs) 916, and/or a navigation module 920, which may include a global positioning system.

The SOC 900 may be based on an ARM instruction set. In an aspect of the present disclosure, the instructions loaded into the CPU 902 may comprise code to search for a stored multiplication result in a lookup table (LUT) corresponding to a multiplication product of an input value and a filter weight. The instructions loaded into the CPU 902 may also comprise code to disable a multiplier during a multiplication operation of the multiplication product when a lookup table hit of the multiplication product is detected. In addition, the instructions loaded into the CPU 902 may comprise code to store a computed multiplication product of the input value and the filter weight when a lookup table miss of the multiplication product is detected.

SOC 900 and/or components thereof may be configured to perform the methods described herein.

Figure 10:
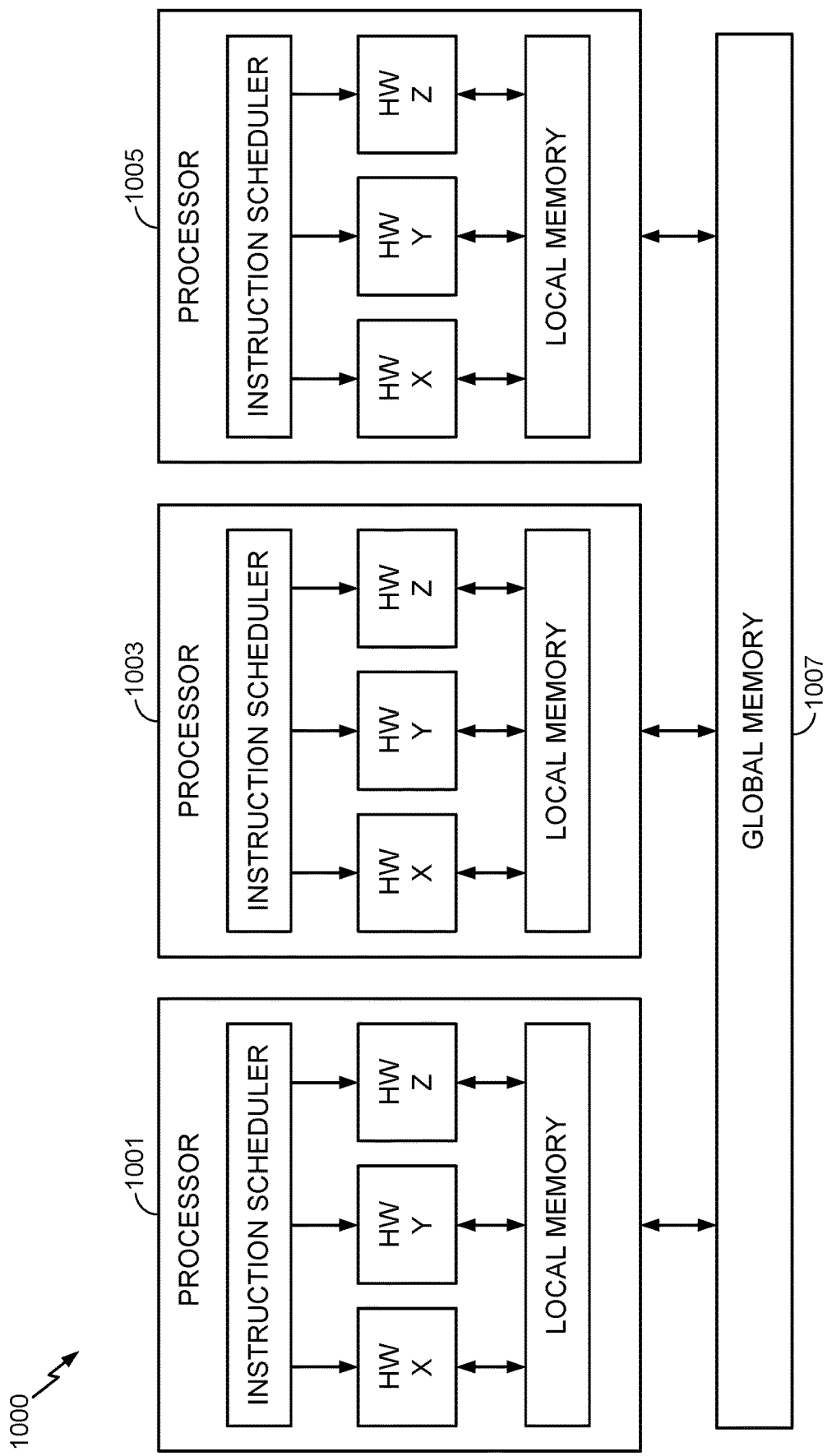
FIG. 10 depicts an example schematic diagram of a multi-processor processing system that may be implemented with embodiments described herein.

FIG. 10 depicts an example schematic diagram of a multi-processor processing system 1000 that may be implemented with embodiments described herein.

In this example, system 1000 includes processors 1001, 1003, and 1005, but in other examples, any number of individual processors may be used. Further, though depicted similarly, processors 1001, 1003, and 1005 may be representative of various different kinds of processors in an electronic device, such as CPUs, GPUs, DSPs, NPUs, and the like as described herein.

Each of processors 1001, 1003, and 1005 includes an instruction scheduler, various hardware sub-components (e.g., hardware X, hardware Y, and hardware Z), and a local memory. The local memory may be a tightly coupled memory (TCM) in some embodiments. Note that the components of each of processors 1001, 1003, and 1005 is shown as the same in this example, each of the processors may have different hardware configurations, different hardware elements, etc.

Each of processors 1001, 1003, and 1005 is also in data communication with a global memory, such as a DDR memory, or other types of volatile working memory.

In some implementations, in a multi-processor processing system such as 1000, one of the processors may act as a master processor. For example, processor 1001 may be a master processor in this example. A master processor may include a compiler that, when executed, can determine how a model, such as a neural network model, will be processed by various components of processing system 1000. For example, hardware parallelism may be implemented by mapping portions of the processing of a model to various hardware (e.g., hardware X, hardware Y, and hardware Z) within a given processor (e.g., processor 1001) as well as mapping portions of the processing of the model to other processors (e.g., processors 1003 and 1005) and their associated hardware.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving input data at a convolutional neural network (CNN) model;
generating a factorized computation network comprising a first plurality of connections between a first layer of the CNN model and a second layer of the CNN model, wherein:
the factorized computation network comprises N inputs,
the factorized computation network comprises M outputs, and
the factorized computation network comprises at least one path from every input of the N inputs to every output of the M outputs;
setting a connection weight for each connection of a second plurality of connections in the factorized computation network to 1 so that a weight density for the factorized computation network is <100%;
performing fast pointwise convolution using the factorized computation network to generate fast pointwise convolution output; and
providing the fast pointwise convolution output to the second layer of the CNN model.

2. The method of claim 1, wherein:
the factorized computation network comprises a number of stages $n=\log_2 N$, and
the first plurality of connections comprises a plurality of weighting connections connected to addition nodes between the first layer of the CNN model and the second layer of the CNN model.

3. The method of claim 2, wherein setting the connection weight for each connection of the second plurality of connections in the factorized computation network to 1 comprises setting all connection weights for at least one stage of the number of stages to 1.

4. The method of claim 2, wherein setting the connection weight for each connection of the second plurality of connections in the factorized computation network to 1 comprises setting a subset of connection weights for at least one stage of the number of stages to 1.

5. The method of claim 1, wherein:
$N \neq 2^n$ or $N \neq M$, and
the method further comprises: performing linear scaling with null activation skipping on the factorized computation network, and
providing the fast pointwise convolution output to the second layer of the CNN model comprises providing only a first M channels of the fast pointwise convolution output to the second layer of the CNN model.

6. The method of claim 1, further comprising: adding a plurality of skip connections to the factorized computation network.

7. The method of claim 1, further comprising:
generating a model output from the CNN model; and
providing the model output to a low-power application running on a mobile electronic device.

8. The method of claim 1, further comprising:
performing, by a first processor, a first inference based on the fast pointwise convolution output;
performing, by a second processor, a second fast pointwise convolution using the factorized computation network to generate second fast pointwise convolution output; and
providing the second fast pointwise convolution output to the second layer of the CNN model.

9. The method of claim 1, wherein:
the input data is received from a sensor in a mobile electronic device, and
the input data is associated with an application running on the mobile electronic device and configured for at least one of: biometric feature detection, human presence detection, environmental condition detection, object detection, or object classification.

10. A processing system, comprising:
a memory comprising computer-executable instructions; and
a first processor configured to execute the computer-executable instructions and cause the processing system to:
receive input data at a convolutional neural network (CNN) model;
generate a factorized computation network comprising a first plurality of connections between a first layer of the CNN model and a second layer of the CNN model, wherein:
the factorized computation network comprises N inputs,
the factorized computation network comprises M outputs, and
the factorized computation network comprises at least one path from every input of the N inputs to every output of the M outputs;
set a connection weight for each connection of a second plurality of connections in the factorized computation network to 1 so that a weight density for the factorized computation network is <100%;
perform fast pointwise convolution using the factorized computation network to generate fast pointwise convolution output; and
provide the fast pointwise convolution output to the second layer of the CNN model.

11. The processing system of claim 10, wherein:
the factorized computation network comprises a number of stages $n = \log_2 N$, and
the first plurality of connections comprises a plurality of weighting connections connected to addition nodes between the first layer of the CNN model and the second layer of the CNN model.

12. The processing system of claim 11, wherein each connection weight of the second plurality of connections in the factorized computation network set to 1 comprise all connection weights for at least one stage of the number of stages.

13. The processing system of claim 11, wherein each connection weight of the second plurality of connections in the factorized computation network set to 1 comprise a subset of connection weights for at least one stage of the number of stages.

14. The processing system of claim 10, wherein:
$N \neq 2^n$ or $N \neq M$, and
the first processor is further configured to cause the processing system to:
perform linear scaling with null activation skipping on the factorized computation network, and
provide, as the fast pointwise convolution output, only a first M channels of the fast pointwise convolution output to the second layer of the CNN model.

15. The processing system of claim 10, further comprising: adding a plurality of skip connections to the factorized computation network.

16. The processing system of claim 10, wherein the first processor is further configured to cause the processing system to:
generate a model output from the CNN model; and
provide the model output to a low-power application running on a mobile electronic device.

17. The processing system of claim 10, wherein:
the first processor is further configured to cause the processing system to perform a first inference based on the fast pointwise convolution output, and
the processing system further comprises a second processor configured to cause the processing system to:
perform a second fast pointwise convolution using the factorized computation network to generate second fast pointwise convolution output; and
provide the second fast pointwise convolution output to the second layer of the CNN model.

18. The processing system of claim 10, wherein:
the input data is received from a sensor in a mobile electronic device, and
the input data is associated with an application running on the mobile electronic device and configured for at least one of: biometric feature detection, human presence detection, environmental condition detection, object detection, or object classification.

19. A non-transitory computer-readable medium comprising instructions that, when executed by a first processor of a processing system, cause the processing system to perform a method, the method comprising:
receiving input data at a convolutional neural network (CNN) model;
generating a factorized computation network comprising a first plurality of connections between a first layer of the CNN model and a second layer of the CNN model, wherein:
the factorized computation network comprises N inputs,
the factorized computation network comprises M outputs, and
the factorized computation network comprises at least one path from every input of the N inputs to every output of the M outputs;
setting a connection weight for each connection of a second plurality of connections in the factorized computation network to 1 so that a weight density for the factorized computation network is <100%;
performing fast pointwise convolution using the factorized computation network to generate fast pointwise convolution output; and
providing the fast pointwise convolution output to the second layer of the CNN model.

20. The non-transitory computer-readable medium of claim 19, wherein:
the factorized computation network comprises a number of stages $n = \log_2 N$, and
the first plurality of connections comprises a plurality of weighting connections connected to addition nodes between the first layer of the CNN model and the second layer of the CNN model.

21. The non-transitory computer-readable medium of claim 20, wherein setting the connection weight for each connection of the second plurality of connections in the factorized computation network to 1 comprises setting all connection weights for at least one stage of the number of stages to 1.

22. The non-transitory computer-readable medium of claim 20, wherein setting the connection weight for each connection of the second plurality of connections in the factorized computation network to 1 comprises setting a subset of connection weights for at least one stage of the number of stages to 1.

23. The non-transitory computer-readable medium of claim 19, wherein:
$N \neq 2^n$ or $N \neq M$, and
the method further comprises: performing linear scaling with null activation skipping on the factorized computation network, and
providing the fast pointwise convolution output to the second layer of the CNN model comprises providing only a first M channels of the fast pointwise convolution output to the second layer of the CNN model.

24. The non-transitory computer-readable medium of claim 19, wherein the method further comprises: adding a plurality of skip connections to the factorized computation network.

25. The non-transitory computer-readable medium of claim 19, wherein the method further comprises:
generating a model output from the CNN model; and
providing the model output to a low-power application running on a mobile electronic device.

26. The non-transitory computer-readable medium of claim 19, wherein the method further comprises:
performing, by a first processor, a first inference based on the fast pointwise convolution output;
performing, by a second processor, a second fast pointwise convolution using the factorized computation network to generate second fast pointwise convolution output; and
providing the second fast pointwise convolution output to the second layer of the CNN model.

27. The non-transitory computer-readable medium of claim 19, wherein:
the input data is received from a sensor in a mobile electronic device, and
the input data is associated with an application running on the mobile electronic device and configured for at least one of: biometric feature detection, human presence detection, environmental condition detection, object detection, or object classification.

* * * * *